United States Patent [19]

Nonaka

[11] Patent Number: 5,264,893
[45] Date of Patent: Nov. 23, 1993

[54] AUTO FOCUS CAMERA

[75] Inventor: Osamu Nonaka, Sagamihara, Japan

[73] Assignee: Olympus Optical Co., Ltd., Tokyo, Japan

[21] Appl. No.: 891,643

[22] Filed: May 29, 1992

[30] Foreign Application Priority Data

Jun. 6, 1991 [JP] Japan .................. 3-135116
Jun. 28, 1991 [JP] Japan .................. 3-183483

[51] Int. Cl.⁵ .............................. G03B 13/36
[52] U.S. Cl. ........................ 354/403; 354/402
[58] Field of Search .................. 354/403, 402

[56] References Cited

U.S. PATENT DOCUMENTS

| | | | |
|---|---|---|---|
| 4,816,856 | 3/1989 | Hamada et al. | 354/402 |
| 4,959,678 | 9/1990 | Nakagawa | 354/403 |
| 5,051,766 | 9/1991 | Nonaka et al. | 354/403 |
| 5,060,003 | 10/1991 | Kotani et al. | 354/403 |
| 5,136,148 | 8/1992 | Nonaka | 354/403 |

Primary Examiner—Russell E. Adams
Attorney, Agent, or Firm—Frishauf, Holtz, Goodman & Woodward

[57] ABSTRACT

An auto focus camera measures the distance to a subject by switching the distance measuring mode according to the moving speed of the subject to provide a picture with a small time lag for a moving subject and to ensure highly accurate photographic for a still subject. In this auto focus camera, a moving object detecting section outputs a signal corresponding to the moving speed of the subject is output in accordance with an operation prior to the release action of first and second release switches, and a CPU determines whether the moving speed is higher or lower than a predetermined value in accordance with the manipulation to instruct that release action. When the discrimination result indicates that the moving speed is slow, a first distance measuring section measures the distance to the subject. When the discrimination result indicates that the moving speed is fast, distance measurement is performed by a second distance measuring section which completes distance measurement in a shorter period of time than the first distance measuring section. The selection of the proper distance measuring section drives a lens adjusting section to control the focal point of a photographic lens.

23 Claims, 10 Drawing Sheets

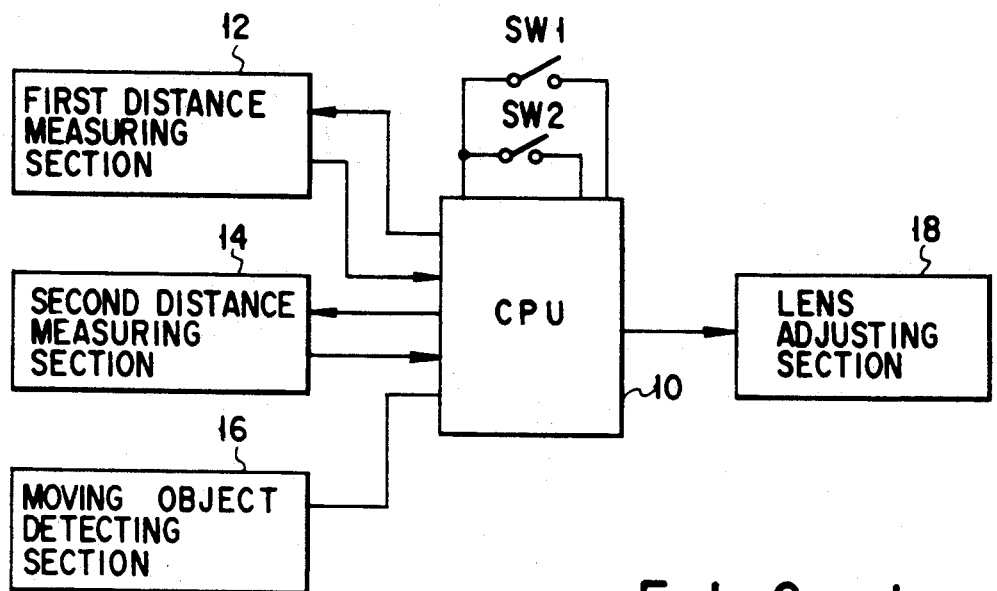
F I G. 1
F I G. 2A
F I G. 2B
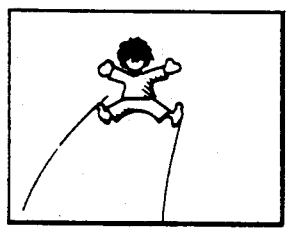
F I G. 2C
F I G. 2D

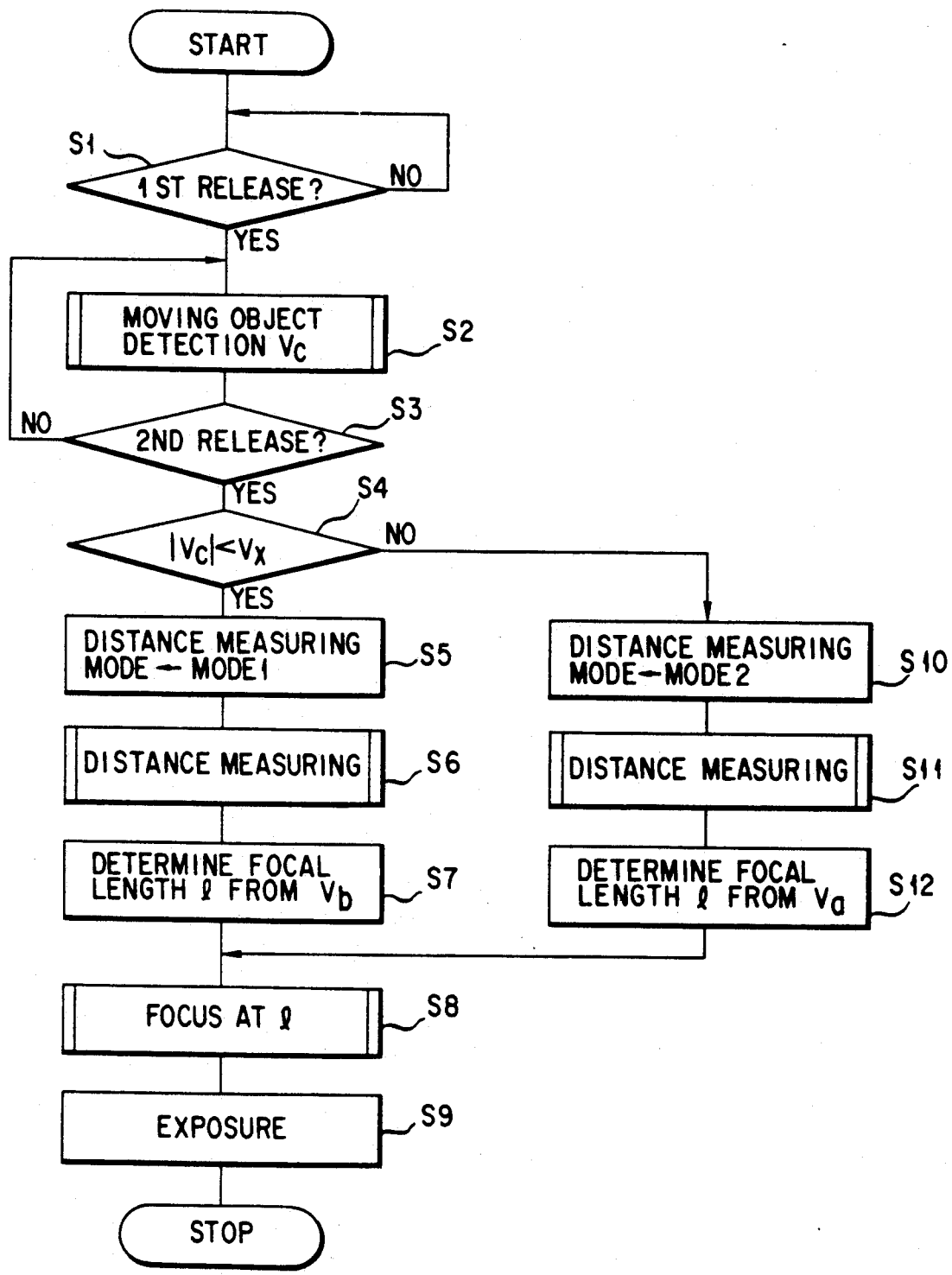
F I G. 7

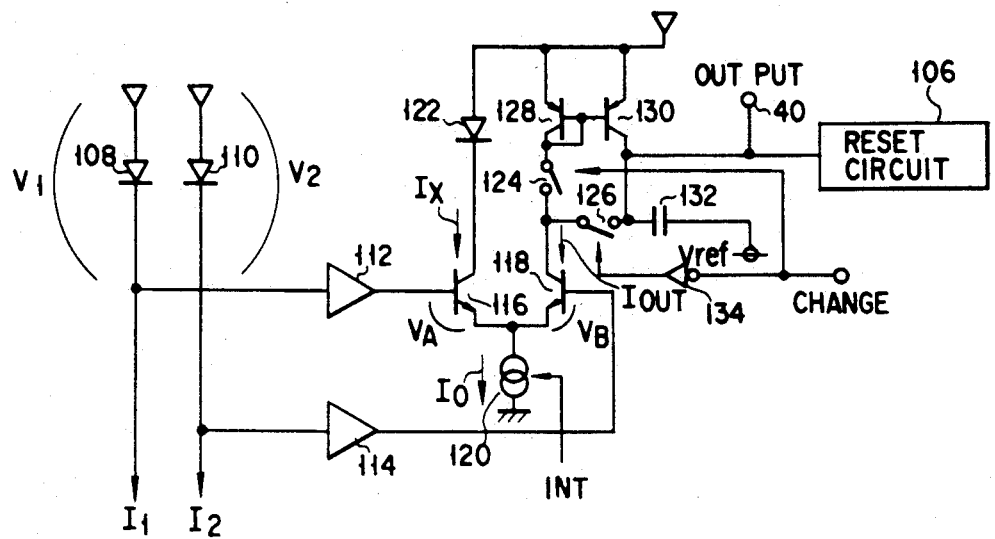
F I G. 12
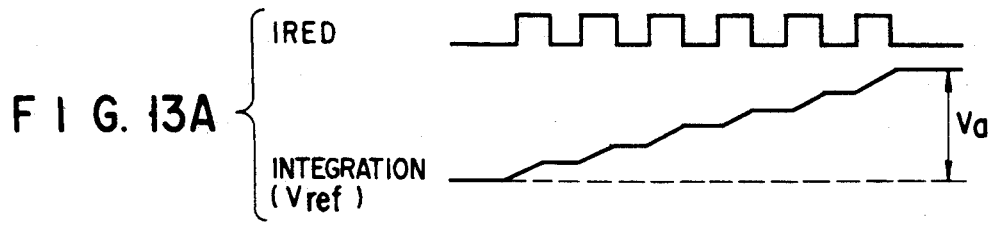
F I G. 13A
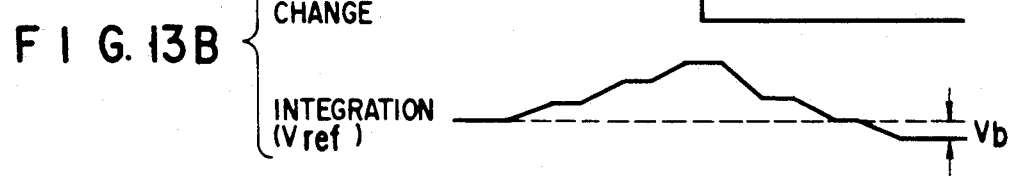
F I G. 13B

AUTO FOCUS CAMERA

BACKGROUND OF THE INVENTION

1. Field of the Invention

The present invention relates to an auto focus camera, and, more particularly, to an auto focus camera which is adapted for use in an auto focus (AF) apparatus of a camera that drives a photographic lens to a focal position based on the output of focal point detecting means.

2. Description of the Related Art

While various functions of a camera become automated, the camera technology for focusing on a subject has been developed toward dealing with a subject that is not easy to cope with. A method of preventing the focal point from shifting due to the movement of a subject moving in the direction of the optical axis of a camera during a release time lag at the time of photographing such a moving subject, is disclosed in, for example, Unexamined Japanese Patent Publication No. 63-159817. The apparatus disclosed in this Japanese publication is structured as follows.

A light-emitting element driver causes an IRED (infrared light-emitting diode) to emit light to a subject via a projecting lens. The light reflected from the subject is collected by a light-receiving lens and is guided to a PSD (position sensitive detector), which in turn outputs a signal current according to the incident position of the reflected light. This signal current is then supplied to a distance computing circuit to compute the distance to the subject. The distance measuring operation is performed plural times in response to a first release signal in accordance with the action of a timing circuit, and the individual measuring results are memorized. The speed of the moving subject is detected by computing how much the subject has moved within a predetermined time. The position of the subject at the beginning of exposure is predicted based on this speed, and the photographic lens is driven according to the prediction.

In other fields than the field of cameras, Unexamined Japanese Patent Publication No. 62-232571 discloses a moving-object distance measuring technique which emits infrared rays to a subject at different timings, determines the speed of the subject according to the measuring results based on the reflection signals, and prevents the focal point from shifting due to the movement of the subject during a release time lag.

However, the acquiring of the speed by operating a distance-measuring apparatus for an ordinary camera twice at different timings is not satisfactory unless a measuring error hardly occurs or the interval between the two measuring timings is large. This method is therefore not so practical.

Because the actual distance measuring inevitably involves an error and in view of the shutter lag, taking a long time to acquire the speed of a subject is not feasible even in the light of the purpose of measuring the distance to a moving subject.

Further, in a so-called active type AF (auto focus) device, to emit light and measure the subject distance according to the reflected light, generally, some attempts have been made, such as increasing the number of light emissions to improve the distance-measuring accuracy and averaging the results. While increasing the number of light emissions improves the distance-measuring accuracy, the measuring time or the time lag becomes longer.

SUMMARY OF THE INVENTION

It is therefore an object of the present invention to provide a more practical auto focus camera which, in measuring the distance to a moving object using plural pieces of measurement data, can perform the measurement at a high processing speed, and shorter the time lag, while the distance-measuring accuracy is improved by increasing the number of light emissions, so that the camera can better cope with a moving object.

It is another object of the present invention to provide an auto focus apparatus which, when a subject is moving, can perform the distance-measuring operation at a high processing speed, and shorter the time lag, while the distance-measuring accuracy is improved by increasing the number of light emissions, thus ensuring sharp focus even on a moving object.

According to one aspect of the present invention, there is provided an auto focus camera comprising: light-emitting means for emitting a pulse-shaped flux of light toward a subject; light-receiving means for receiving the flux of light reflected from the subject and outputting a signal according to a distance to the subject; subject movement detecting means for outputting information about movement of the subject based on the signal from the light-receiving means; distance computing means for computing a distance to the subject based on the signal from the light-receiving means; comparing means for permitting the subject movement detecting means to function before shutter release and discriminating whether or not movement of the subject detected by the subject movement detecting means is faster than a predetermined speed; control means for permitting the light-emitting means to perform light emission for a first predetermined number of times in response to the shutter release and permitting the distance computing means to compute a distance at a time of this light emission when a result of discrimination by the comparing means indicates that the subject is moving at a low speed or is still, and permitting the light-emitting means to perform light emission for a second predetermined number of times fewer than the first predetermined number of times in response to the shutter release and permitting the distance computing means to compute a distance when the result of discrimination by the comparing means indicates that the subject is moving at a high speed; and distance adjusting means for driving a photographic lens based on an output of the distance computing means controlled by the control means.

According to another aspect of the present invention, there is provided an auto focus camera comprising: subject movement information detecting means for detecting information according to movement of a subject; first distance measuring means for detecting a distance to the subject with priority on time when a result of detection by the subject movement information detecting means indicates that the subject is moving at a high speed; second distance measuring means for detecting a distance to the subject with priority on accuracy when the result of detection by the subject movement information detecting means indicates that the subject is moving at a low speed; and focal point adjusting means for adjusting a focal point of a photographic lens based on an output of the first or second distance measuring means.

According to still another aspect of the present invention, there is provided an auto focus camera comprising: first light-emitting means capable of emitting a pulse-shaped flux of light toward a subject in a center portion of a frame plural times; second light-emitting means capable of emitting a pulse-shaped flux of light toward a subject in a peripheral portion of the frame plural times; first light-receiving means for receiving the flux of light reflected from the subject in the center portion of the frame and outputting a first signal according to a distance to the subject in the center portion of the frame; second light-receiving means for receiving the flux of light reflected from the subject at the peripheral portion of the frame and outputting a second signal according to a distance to the subject at the peripheral portion of the frame; movement detecting means for receiving the first signal from the first light-receiving means and outputting information about movement of the subject in the center portion of the frame; comparing means for comparing the information about the movement of the subject in the center portion of the frame with a predetermined value based on an output of the movement detecting means in response to a release signal; and subject distance determining means for determining a subject distance for focus adjustment of a photographic lens based on the first signal and the second signal when a result of comparison by the comparing means indicates that a moving speed of the subject in the center portion of the frame is lower than the predetermined value, and determining the subject distance based on the first signal when the result of comparison by the comparing means indicates that the moving speed of the subject in the center portion of the frame is higher than the predetermined value.

According to still another aspect of the present invention, there is provided an auto focus camera comprising: an operation switch to be operated before a release action; moving object detecting means for outputting information dependent on a moving speed of a subject in a direction of an optical axis of a photographic lens in accordance with manipulation of the operation switch; first distance measuring means for measuring a subject distance in a center portion of a photographic frame; second distance measuring means for measuring a subject distance at a peripheral portion of the photographic frame; and focal point adjusting means for inhibiting distance measurement by the second distance measuring means and adjusting a focal point of the photographic lens based on an output of the first distance measuring means when it is discriminated or determined that subject is moving based on the information dependent on the moving speed acquired by the moving object detecting means at a time of manipulation of a release switch for instructing the release action, and adjusting the focal point of the photographic lens based on outputs of the first and second distance measuring means when it is discriminated or determined that the subject is still.

According to another aspect of the present invention, there is provided an auto focus camera comprising: distance measuring means for measuring distances to subjects in a center portion and at a peripheral portion of a photographic frame; moving object detecting means for detecting information dependent on movement of a subject in a direction of an optical axis; and control means for determining a photographic range based on the distances to the subjects in the center portion and the peripheral portion of the photographic frame measured by the distance measuring means when the result of detection by the moving object detecting means indicates that the subject is almost still, and inhibiting measurement of subject distance at the peripheral portion of the photographic frame and determining the photographic range based on the distance of the subject in the center portion when the subject is moving.

According to still another aspect of the present invention, there is provided an auto focus camera comprising: moving object detecting means for detecting information dependent on movement of a subject in a direction of an optical axis; discrimination means for discriminating whether the subject is almost still or is moving based on the information output from the moving object detecting means; first control means for executing a first distance measuring mode when the discrimination means discriminates that the subject is still; and second control means for executing a second distance measuring mode which takes a longer time for distance measurement than the first distance measuring mode, when the discrimination means discriminates that the subject is moving.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram schematically illustrating the basic structure of an auto focus camera according to a first embodiment of the present invention;

FIGS. 2A, 2B, 2C, and 2D are diagrams showing compositions of a moving subject which a photographer tries to take a picture;

FIG. 7 is a flowchart for explaining the operation of the auto focus camera according to the first embodiment of the present invention;

FIG. 12 is a diagram exemplifying specific structures of a compressing circuit, a buffer, an expanding/integrating circuit, an output terminal, a direction switching circuit and a reset circuit;

FIG. 13A is a timing chart of the IRED emission and integrating operation in normal distance-measuring mode and FIG. 13B is a timing chart of the IRED emission, direction switching and integrating operation at the time of detecting a moving object.

DETAILED DESCRIPTION OF THE PREFERRED EMBODIMENTS

Figure 3:
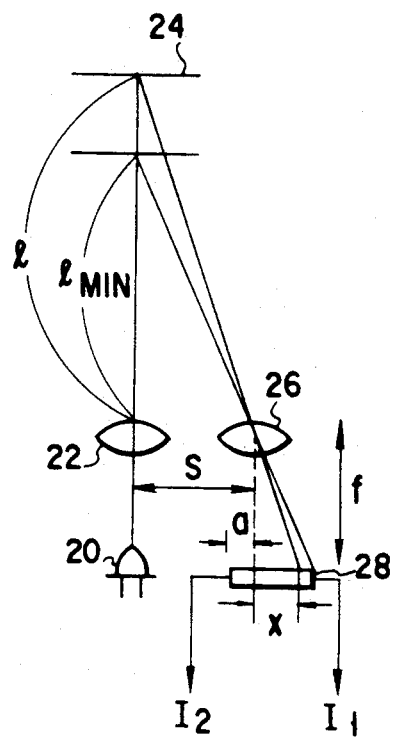
FIG. 3 is a diagram illustrating a well-known one-spot distance measuring apparatus using a PSD, which is the base of the auto focus camera of the present invention.

The present invention has been premised on the fact that the influence of the time lag is more crucial to photographing a moving subject than the improvement of the distance-measuring accuracy by increasing the number of light emissions, and it aims at eliminating the influence of the time lag by providing an accuracy-priority first distance measuring mode which increases the number of light emissions and a time-priority second distance measuring mode that involves fewer light emissions and shorter time lag, and by focusing on a subject in second distance measuring mode when the subject is moving.

To begin with, the influence of the time lag will be explained referring to FIGS. 2A through 2D.

FIG. 2A illustrates a photograph of a composition a photographer expects. If the time lag till photographing is long, the subject would move while the distance is being measured. Consequently, the composition will change as shown in FIG. 2B. Further, as the distance to the moving subject varies with the time while measuring the distance, this results in an out-of-focus photograph.

According to the first embodiment of the present invention, therefore, a photographer directs the camera at a subject, presses the shutter release button halfway to be ready for the right instant in a state as shown in FIG. 2C, and fully presses the release button in a state as shown in FIG. 2A, whereby it is detected in the half-pressed state whether or not the subject is moving. If the subject is moving, photographing is effected in the aforementioned second distance measuring mode, thus ensuring a photograph as shown in FIG. 2D which hardly differs from the on in FIG. 2A in view of the composition and is not significantly out of focus.

The distance-measuring accuracy in this case of course is lower than the one acquired by improving the reliability by measuring the distance to a still object several times and then averaging the results. Since focusing is executed using the measured results immediately before photographing the moving object in the first embodiment, the resultant picture will not be considerably out of focus like the one shown in FIG. 2B.

The first embodiment will no be described specifically.

FIG. 1 is a block diagram schematically illustrating the basic structure of an auto focus camera embodying the present invention. In this diagram, connected to an operation control circuit (CPU) 10 constituted by a one-chip microcomputer are a first distance measuring section 12 having the aforementioned first distance measuring mode, a second distance measuring section having the second distance measuring mode, a moving object detecting section 16 for detecting if a subject is moving, and a lens adjusting section 18 for adjusting the focal point of a photographic lens (not shown) by selecting either one of the distance measuring sections. The CPU 10 is also connected to a switch SW1 which is closed when the release button is pressed halfway and a switch SW2 which is closed when the release button is fully pressed.

When the release button is pressed halfway to close the switch SW1, the moving object detecting section 16 is activated to detect if the subject is moving. In accordance with the output of the moving object detecting section 16, the CPU 10 determines whether to use the first distance measuring section 12 or the second distance measuring section 14. When the subject is still, the first distance measuring section 12 is used to effect distance measurement at high accuracy with a long time lag. In accordance with the measuring result, the lens adjusting section 18 is driven to focus on the subject. When the subject is considered to be moving, the second distance measuring section 14 is used to effect distance measurement with a short time lag, and focusing is executed according to the result.

A well-known one-spot distance measuring apparatus using a PSD, which is the base of the auto focus camera of the present invention, will now be described referring to FIG. 3. The optical system for distance measurement used in this distance measuring apparatus is the basic active type AF.

When an infrared light-emitting diode (IRED) 20 emits light for AF to a subject 24 via a projecting lens 22, a light-receiving lens 26 collects the light reflected on the subject 24 and forms an image on a PSD 28. At this time, the incident position x of the reflected light is a function of a subject distance l as shown in an equation (1) from the principle of the triangular distance measuring system.

$$x = \frac{S \cdot f}{l} \quad (1)$$

where S is the distance between principal points of the projecting lens and the light-receiving lens (base length), and f is the focal length of the light-receiving lens 26. The PSD 28 is positioned on this focal length.

The output of the PSD 28 is a function of the incident position x of the AF signal light. Given that the total signal light current $I_{P0}$ for yielding two current signals $I_1$ and $I_2$ and the length of the PSD 28 is $t_p$, the subject distance l is obtained from the following equations.

$$I_1 = \frac{a + x}{t_p} I_{P0} \quad (2)$$

$$I_2 = \frac{t_p - (a + x)}{t_p} I_{P0} \quad (3)$$

$$\frac{I_1}{I_1 + I_2} = \frac{a + x}{t_p} = \frac{1}{t_p} a + \frac{S \cdot f}{l} \qquad (4)$$

where a is the length from a point where a line extending from the principal point of the light-receiving lens 26 and parallel to a line connecting the center of light emission of the IRED 20 and the principal point of the projecting lens 22 crosses the PSD 28 to the end of the PSD 28 on the side of the IRED 20. The reciprocal of the subject distance, $1/l$, is acquired from the output of the PSD 28.

The averaging of the aforementioned measuring results can be accomplished simply by an analog circuit by charging a capacitor (not shown) with a current signal proportional to $I_1/(I_1+I_2)$ in the equation (4) in synchronism with the repetitive light emission of the IRED 20.

While generally, detection of a moving object is easily understood by acquiring the amount of a change in time, v, of the subject distance l, the same detection is possible by attaining the amount of a change in time of the reciprocal $1/l$ of the subject distance l.

Figure 4:
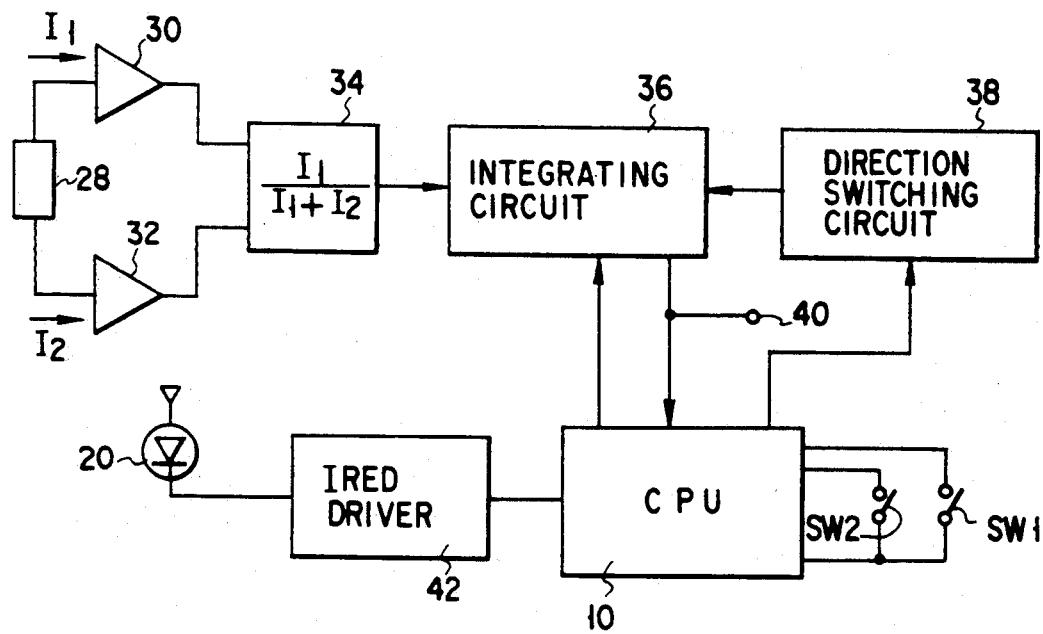
FIG. 4 is a block structural diagram of a distance measuring apparatus having the functions of a first distance measuring mode, a second distance measuring mode, and detection of a moving object.

FIG. 4 is a block diagram of a distance measuring apparatus having three functions of a first distance measuring mode, a second distance measuring mode, and detection of a moving object. In this diagram, connected to the PSD 28 are preamplifiers 30 and 3 for amplifying the outputs of the PSD 28 at a low-input impedance. The outputs of the preamplifiers 30 and 32 are input to an analog operation circuit 34 which outputs a signal proportional to the reciprocal of the subject distance l as explained referring to the equation (4). The analog operation circuit 34 computes $I_1/(I_1+I_2)$ based on both outputs $I_1$ and $I_2$. This analog operation circuit 34 may employ a system of obtaining the difference between the outputs after they are subjected to a well-known logarithmic compression.

The output current of the analog operation circuit 34 is integrated by the capacitor in an integrating circuit 36. The integration timing and integration direction of this integrating circuit 36 are controlled according to the CPU 10 having a timing function and the output of a direction switching circuit 38. The result of the final integration in a predetermined sequence is input via an output terminal (data terminal) 40 to the CPU 10.

The CPU 10 causes an IRED driver 42 at a given timing to drive the IRED 20 as the aforementioned light-emitting element a predetermined number of times, and inputs an integration timing synchronous with the driving to the integrating circuit 36.

The direction switching circuit 38 selects the integration direction in accordance with the output control of the CPU 10. It is to be noted that the integrating circuit 36 is allowed to have the following two statuses by the direction switching circuit 38.

(1) To perform integration so that the output voltage is output in a GND direction (negative direction) from a reference level $V_{ref}$.

(2) To perform integration so that the output voltage is output in a direction of electric wave voltage (positive direction) from $V_{ref}$.

In other words, it is possible to discriminate whether or not a subject is moving from the voltage output acquired finally by switching the integration direction between the first half and the second half of the continual light emission of the IRED 20. This is the detection of a moving object.

The switches SW1 and SW2 are respectively associated with a first release switch which is closed when the release button is pressed halfway and a second release switch which is closed when the release button is fully pressed.

A description will now be given of how the IRED emission and the integrating operation are controlled in the thus-structured circuit, referring to FIGS. 5A through 5C.

Figure 5:
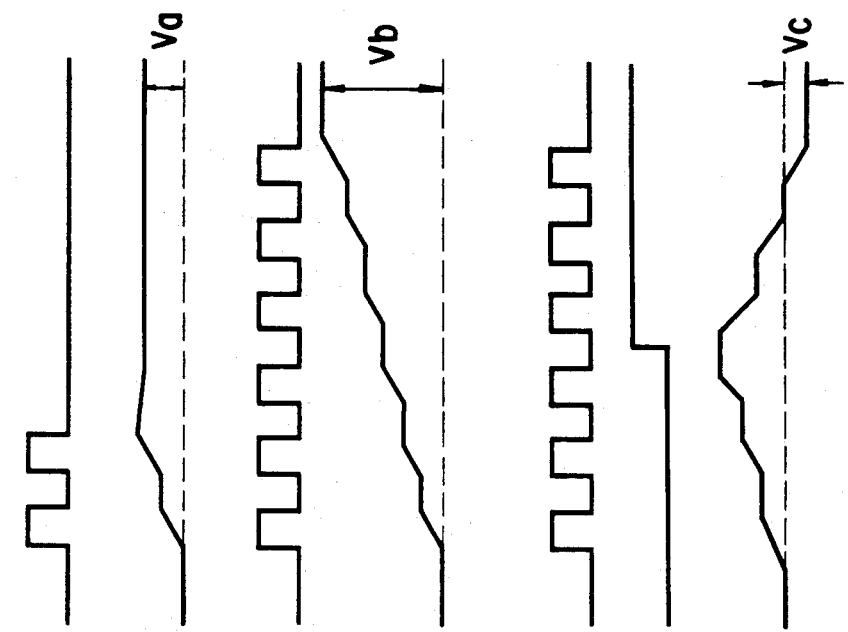
FIG. 5A is a timing chart of the IRED emission and integrating operation in second distance measuring mode.
FIG. 5B is a timing chart of the IRED emission and integrating operation in first distance measuring mode.
FIG. 5C is a timing chart of the IRED emission, direction switching and integrating operation at the time of detecting a moving object.

FIG. 5A illustrates the IRED emission and integrating operation in the aforementioned second distance measuring mode. In this case since the IRED 20 emits light only twice, much improvement of the accuracy by the integration cannot be expected. It is however apparent that as the number of light emissions of the IRED 20 is fewer, the time lag is shorter than the one involved in the distance measurement in the first distance measuring mode shown in FIG. 5B. In this case, the output is input as $V_a$ to the CPU 10.

FIG. 5B illustrates the distance measurement in the first distance measuring mode. This mode performs the IRED emission six times and adds the measuring result $I_1/(I_1+I_2)$ six times as compared with the one shown in FIG. 5A. Therefore, the CPU 10 divides the resultant value by six to average the measuring results, yielding a more reliable measuring result. In other words, it is assumed in this mode that if noise appears on each result at random, the noise can be canceled out by averaging, thus ensuring highly accurate distance measurement. In this case, the output is input as $V_b$ to the CPU 10.

FIG. 5C illustrates the waveforms acquired by the IRED driving and the integration at the time of detecting a moving object. When the IRED 20 continually emits light at equal intervals and the direction of integration is switched by the direction switching circuit 38 upon completion of the half cycle of the total number of light emissions, the integration waveform as shown in FIG. 5C is obtained. As the subject is moving and the reciprocal of the distance l to the subject is varying with the time, the integration voltage in the positive direction and the integration voltage in the opposite direction differ from each other, yielding an output $V_c$ as illustrated. When the subject is still, $V_c=0$; and as the speed of the subject is faster, $V_c$ gets larger.

Figure 6:
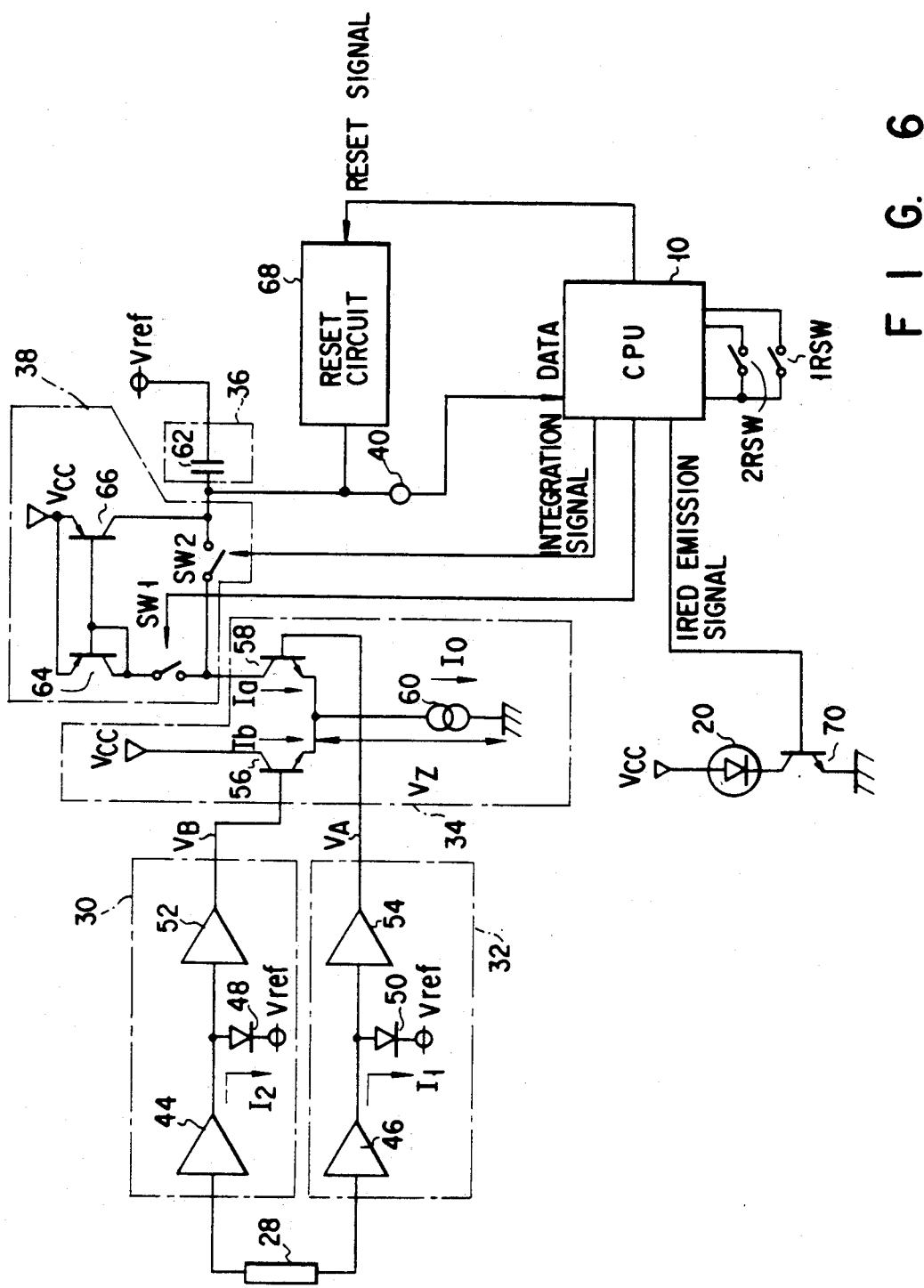
FIG. 6 is a more specific circuit structural diagram of the distance measuring apparatus shown in FIG. 4.

FIG. 6 is a diagram illustrating a more specific circuit structure of the distance measuring apparatus shown in FIG. 4.

Buffers 44 and 46 in the preamplifiers 30 and 32 amplify the output currents of the PSD 28, and the amplified currents flow into compressing diodes 48 and 50. The difference between the compressing voltages are input via buffers 52 and 54 to a differential operation circuit which comprises transistors 56 and 58 and a constant current source 60. This differential operation circuit is equivalent to the analog operation circuit 34 which performs the computation expressed in the equation (4).

Given that the results of amplifying the two output currents of the PSD 28 are $I_1$ and $I_2$, the following equations involving individual symbols in FIG. 6 are satisfied.

$$V_A = V_T l_n + \frac{I_a}{I_s} V_Z = V_{ref} + V_T l_n \frac{I_1}{I_s} \qquad (5)$$

-continued $$V_B = V_T \ln \frac{I_b}{I_s} + V_Z = V_{ref} + V_T \ln \frac{I_2}{I_s} \quad (6)$$

where $I_s$ is the reverse saturation current of the compressing diodes 48 and 50 and the transistors 56 and 58, and $V_T$ is the thermal voltage.

As the value of the current of the constant current source 60 is $I_0$.

$$I_a + I_b = I_0 \quad (7)$$

From the equations (5) and (6), the following equation (8) is derived.

$$I_a = \frac{I_1}{I_1 + I_2} I_0 \quad (8)$$

Thus, $I_a$ becomes the output of the analog operation circuit 34 shown in FIG. 4.

A current mirror circuit comprising transistors 64 and 66 serves to integrate the output $I_a$ into an integrating capacitor 62 in the integrating circuit 36 so as to change the level of the data terminal 40 in the positive direction. The aforementioned integration is performed by setting on the switch SW1 associated with the first release switch 1RSW connected to the CPU 10 and setting off the switch SW2 associated with the second release switch 2RSW also connected to the CPU 10. When $I_a$ is integrated into the integrating capacitor 62 so as to change the level of the data terminal 40 in the negative direction, the CPU 10 controls two integration signals so that the switch SW1 is set off and the switch SW2 is set on.

A reset circuit 68 serves to determine the integration start level of the integrating capacitor 62 in accordance with a reset signal output from the CPU 10. The CPU 10 controls the light emission of the IRED 20 via a driver transistor 70. More specifically, to emit light from the IRED 20, the CPU 10 controls the integration signal in synchronism with the emission to set the switch SW1 or SW2 on, so that the current $I_a$ proportional to the reciprocal $1/l$ of the subject distance flows into the integrating capacitor 62 for integration as expressed in the following equation (9) derived from substituting the equation (4) into the equation (8).

$$I_a = \frac{1}{t_p} \left( a + \frac{S \cdot f}{l} \right) \cdot I_0 \quad (9)$$

Given that the capacity of the integrating capacitor 62 is $C_{INT}$ and the time for a single integration is $t_p$ and the number of integrations is n, then the integration voltage $V_{INT}$ is expressed by an equation (10) below.

$$V_{INT} = \frac{I_a \times t_{INT}}{C_{INT}} \times n \quad (10)$$

When detection of a moving object is carried out as shown in FIG. 5C, for example, since the integration direction is switched every three integrations, $$V_C \approx 3 \times \frac{t_{INT}}{C_{INT}} \times (I_{a1} - I_{a2}) \quad (11)$$

where $I_{a1}$ and $I_{a2}$ are $I_a$ corresponding to the averaged distance to the subject for the first half and second half of integration.

The operation of an auto focus camera according to the first embodiment of the present invention will be described referring to the flowchart shown in FIG. 7.

In FIG. 7, first, it is determined whether the first release switch 1RSW is set on in step S1. The sequence for distance measurement will not start until the first release switch 1RSW is set on. According to another embodiment, however, this switch 1RSW has only to be set on before shutter release, and may be replaced with the detection of a face of a photographer by means of a photo reflector or the like to detect the camera holding state. Alternatively, a pressure-sensitive switch may be provided in the grip portion of the camera instead of using the switch 1RSW.

When the first release switch 1RSW is closed in step S1, the CPU 10 advances to step S2 and sets the moving object mode to start detection of a moving object. The subroutine for this moving object detection will be discussed later.

As a result, $V_C$ is input to the CPU 10 by an A/D converter (not shown) incorporated in the CPU 10.

The flow then moves to step S3 to wait for an input from the second release switch 2RSW which is closed by shutter release. In this step S3, the moving object detection is repeated under the control of the CPU 10 until the second release switch 2RSW is closed, sequentially updating $V_C$.

When the second release switch 2RSW is closed in step S3, the flow advances to step S4 where the absolute value of the moving-object detection result $V_C$ is compared with a predetermined voltage value $V_X$, which may be a value of about $\Delta l/l = 0.05$ (1/m). When $V_C$ is smaller than $V_X$, it is judged that the moving speed does not change from the speed of an almost still subject, and the flow moves to step S5.

In step S5, the first distance measuring mode is selected which performs distance measurement with high accuracy with a longer time lag than that of the second distance measuring mode as shown in FIG. 5B. In the next step S6 the distance measurement based on the first distance measuring mode is carried out. The subroutine for this distance measurement will be discussed later.

The focal length l is acquired from the output result $V_b$ in step S7, and the focusing operation is executed in step S8. Then, an exposing operation takes place in step S9, thus terminating the distance measuring operation and photographing by the auto focus camera of the present invention.

When the moving-object detection result $V_C$ is equal to or greater than $V_X$, which means that the moving speed of the subject is not negligible, the flow moves to step S10. In step S10, the second distance measuring mode is selected which accomplishes distance measurement with a shorter time lag at the price of the accuracy lower than that of the first distance measuring mode as shown in FIG. 5A. In the next step S11, the distance measurement based on the second distance measuring mode is carried out.

Then, the focal length l is acquired from the output result $V_a$ in step S12, and the flow advances to steps S8 and S9 to terminate the operation.

Figure 8:
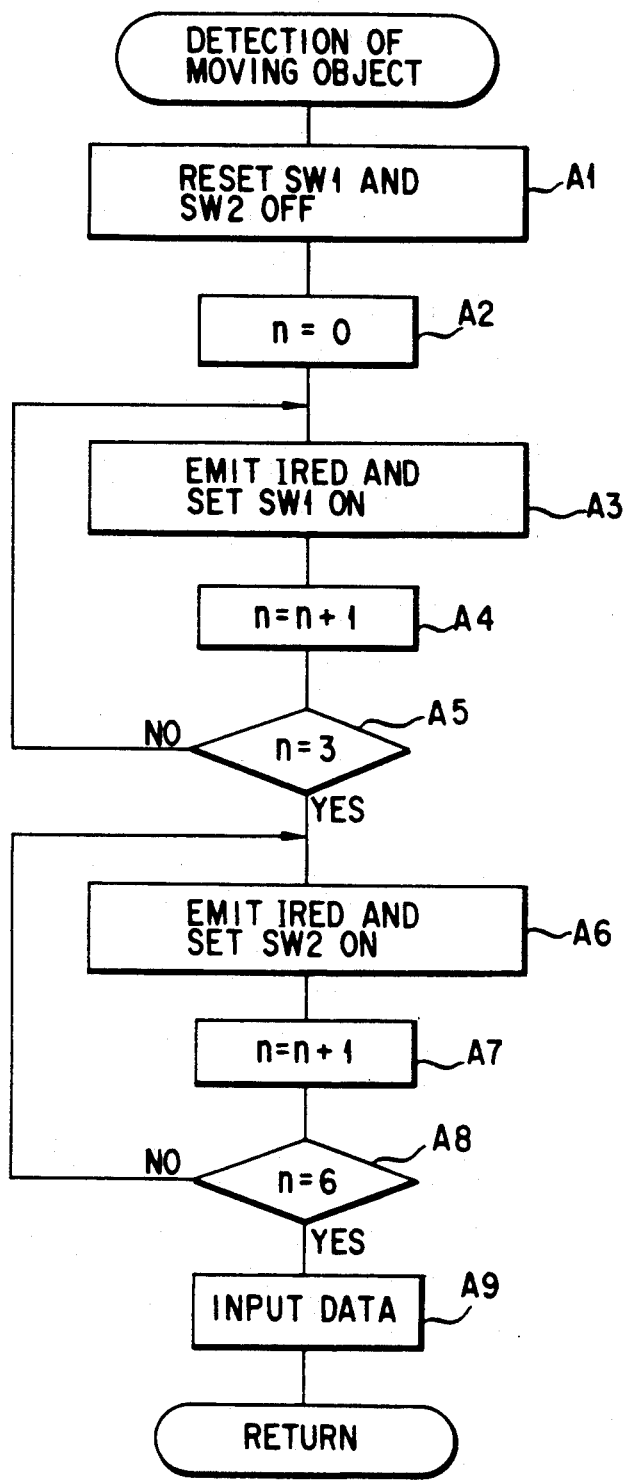
FIG. 8 is a subroutine illustrating the operation of detecting a moving object.

FIG. 8 is a subroutine illustrating the operation of detecting a moving object.

In step A1, the first release switch 1RSW (switch SW1) and second release switch 2RSW (switch SW2)

are set off and the integrating capacitor is initialized. Then, the number of light emissions for the IRED 20 is reset in step A2. Then, the IRED 20 emits light and the switch SW1 is set on in step A3. The number of light emissions of the IRED 20 is incremented in step A4 and the resultant number of light emissions is judged in step A5.

The flow does not move to step A6 until n=3 in step A5 or until the aforementioned integration in the positive direction is performed three times. In step A6, like in step A3, the IRED 20 emits light and the switch SW2 is set on. The number of light emissions of the IRED 20 is incremented in step A7 and the resultant number of light emissions is judged in step A8.

When the number of light emissions is "6" or the number of light emissions in the negative direction is performed three times, the flow advances to step A9 where the output result $V_c$ expressed by the equation (11) is input as data to the CPU 10 from the output terminal 40 as shown in FIG. 5C.

Figure 9:
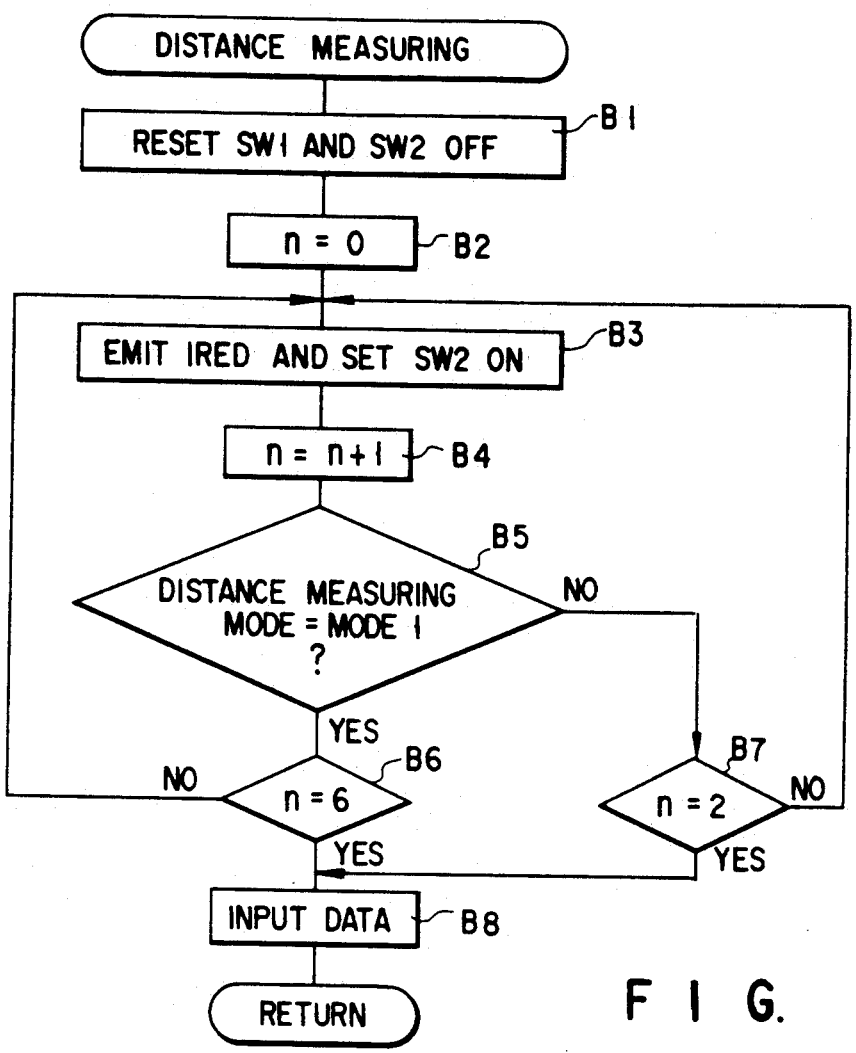
FIG. 9 is a subroutine for explaining the distance-measuring operations in first and second distance measuring modes.

The distance measuring operations in the first distance measuring mode and second distance measuring mode will be described below referring to the subroutine in FIG. 9.

In step B1, the switches SW1 and SW2 are set off and the integrating capacitor is initialized. Then, the number of light emissions for the IRED 20 is reset in step B2. In the next step B3, only the switch SW2 is set on in synchronism with the light emission of the IRED 20. The number of light emissions of the IRED 20 is incremented in step B4 and the distance measuring mode is discriminated in step B5.

If the mode is judged as the first distance measuring mode for accomplishing the distance measurement with a longer time lag in step B5, the flow moves to step B6 to check the number of light emissions, and a sequence of steps B3 to B6 is performed thereafter until six light emissions of the IRED 20 are executed, thus terminating the distance measuring operation. If the mode is judged as the second distance measuring mode for accomplishing the distance measurement with a shorter time lag in step B5, the flow moves to step B7 to check the number of light emissions, and a sequence of steps B3 to B5 and B7 is performed thereafter until two light emissions of the IRED 20 are executed, thus terminating the distance measuring operation.

In either case, the output result $V_a$ or $V_b$ is input to the CPU 10 from the output terminal 40 as shown in FIG. 5A or FIG. 5B in step B8. This can be expressed by the same equation for $V_{INT}$ given in the equation (10). The CPU 10 can therefore compute the reciprocal 1/l of the subject distance l from the known value n, $t_{INT}$, $C_{INT}$, $I_0$, a, S, f and $t_p$.

The above-described sequences and computations are executed by the CPU 10.

The second embodiment of the present invention will be described below.

While the above-described first embodiment measures the subject distance by increasing the number of light emissions when a subject is still and by decreasing the number of light emission when the subject is moving, the second embodiment measures the distance to a subject in the center portion of a frame and other subjects present in other portion than the center portion when a target subject is still and measures the distance only to the subject in the center portion of the frame when the target subject is moving.

Referring to FIGS. 2A through 2D, this operation will be discussed more specifically. With the shutter release done with the composition as shown in FIG. 2A, as the distances to multiple points are measured after the shutter release, increasing the time lag till actual photographing, the subject moves while measuring the subject distance. The actually photographed picture would be as shown in FIG. 2B.

According to the second embodiment, therefore, the camera is directed to a subject and the release button is pressed halfway in the state shown in FIG. 2C, so that the camera can detect whether the subject is moving. When the release button is pressed fully later with the composition shown in FIG. 2A, the distance to the necessary point is measured. This shortens the time lag, yielding a photograph as shown in FIG. 2D which provides the almost intended composition in sharp focus that hardly differs from the composition shown in FIG. 2A.

Figure 10:
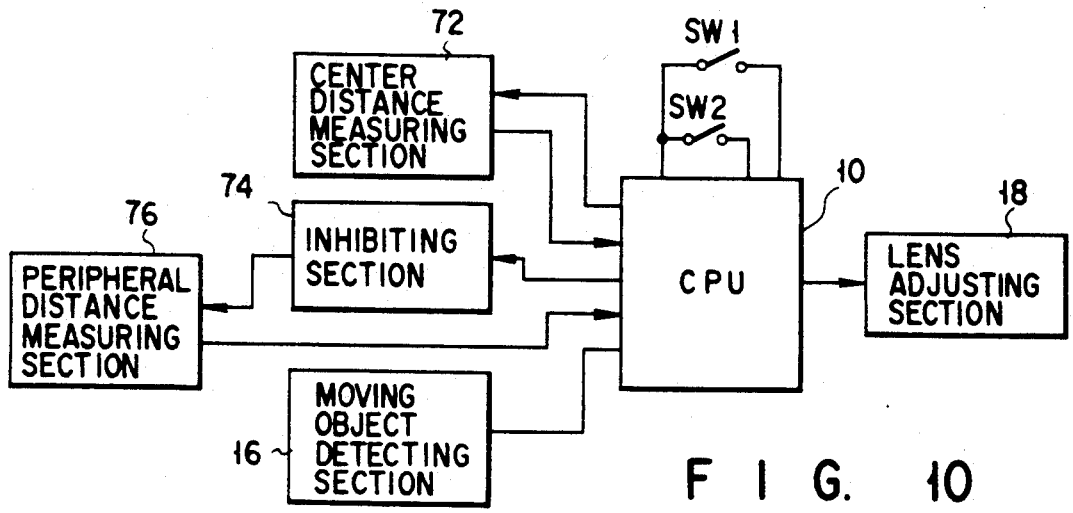
FIG. 10 is a block diagram schematically illustrating the basic structure of an auto focus camera according to a second embodiment of the present invention.

FIG. 10 is a block diagram schematically illustrating the basic structure of an auto focus camera according to the second embodiment of the present invention.

In this diagram, connected to the CPU 10 are a center distance measuring section 72 for measuring the distance to the center portion of a frame in a viewfinder, a peripheral distance measuring section 76 for measuring the distance to the peripheral portion of the frame in the viewfinder via an inhibiting section 74, a moving object detecting section 16 for detecting if the subject is moving, and a lens adjusting section 18 for adjusting the focal point of a photographic lens (not shown). The CPU 10 is also connected to a switch SW1 that is closed when the release button is pressed halfway and a switch SW2 that is closed when the release button is fully pressed.

When the release button is pressed halfway to close the switch SW1, the moving object detecting section 16 is activated to detect if the subject is moving. When the result of the detection indicates that the subject is moving, the distance to the center portion of the frame in the viewfinder is measured by the center distance measuring section 72 at the same time the switch SW2 is pressed. In this case, the inhibiting section 74 inhibits the function of the peripheral distance measuring section 76, and exposure takes place after the focusing operation is finished.

When the subject is not moving, the center distance measuring section 72 and peripheral distance measuring section 76 are sequentially activated upon pressing of the switch SW2, that subject which provides the closest distance among those measuring results is focused before exposure takes place. Those sequence controls are performed by the CPU 10.

Figure 11:
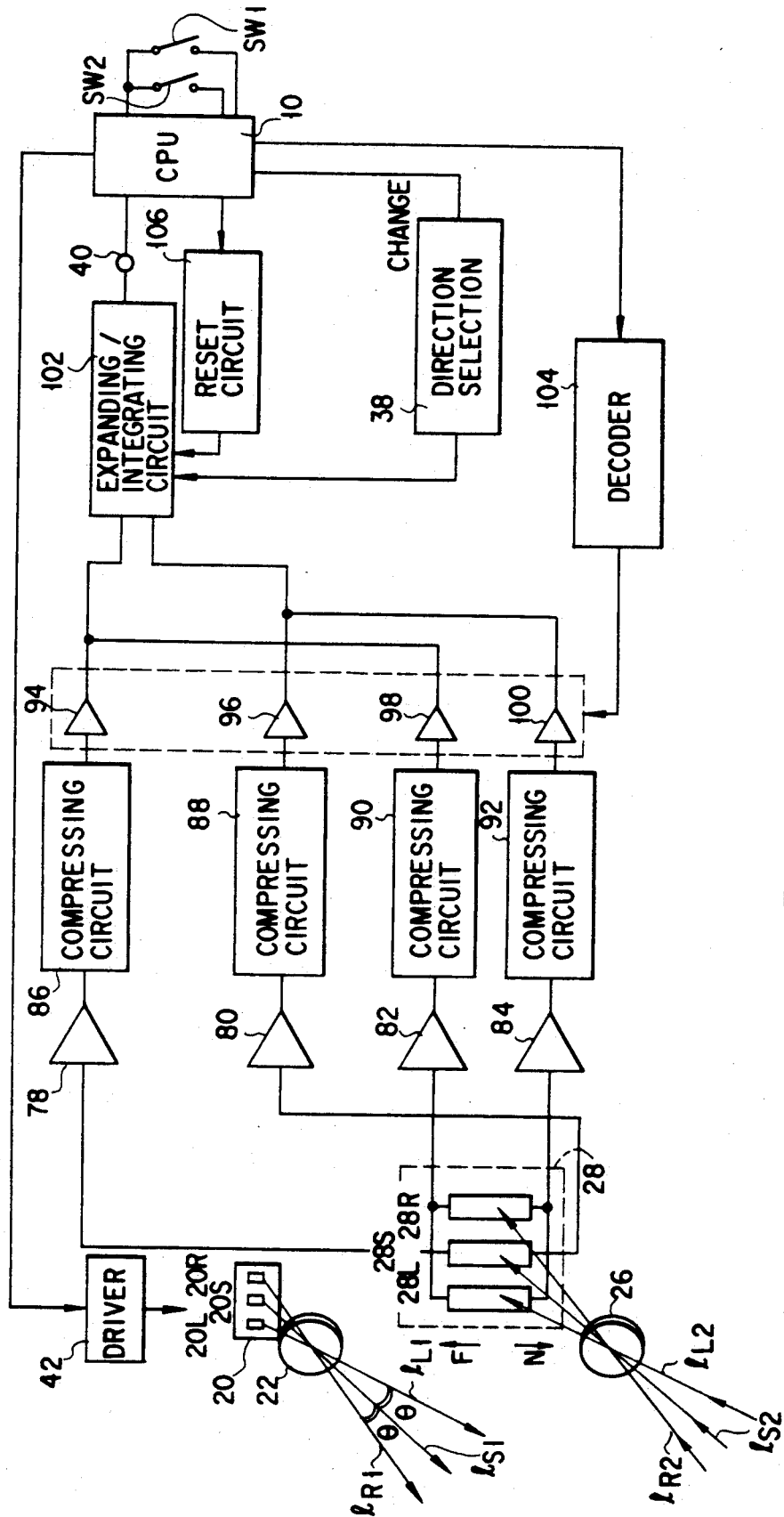
FIG. 11 is a block structural diagram of the auto focus camera according to the second embodiment employing a well-known active triangular distance measuring system.

FIG. 11 is a block structural diagram of the auto focus camera according to the second embodiment employing a well-known active triangular distance measuring system. In this diagram, AF signal light from the IRED 20 is directed on a subject (not shown) via the projecting lens 22. The light reflected from the subject is received by the PSD 28 via the light-receiving lens 26, and the distance is acquired from the incident position of the reflected light.

The IRED 20 and PSD 28 are divided into three portions to measure the distance of not only the center portion but also of the right and left portions; those portions are denoted by 20S, 20L, 20R, 28S, 28L and 28R in the diagram.

The AF light from the IRED 20L is emitted with a certain angle θ to the optical axes of the projecting and light-receiving lenses 22 and 26 and the photographic lens (not shown) as indicated by $l_{L1}$. When the subject is located at the light-emitted position, the light enters the light-receiving lens 26 through the optical path of $l_{L2}$.

The incident angle of $l_{L2}$ is dependent on the subject distance with respect to the direction that connects the principal points of the projecting and light-receiving lenses 22 and 26 (direction of the base length). The signal light spot incident to the PSD 28 therefore takes a different position to the base length direction of the PSD 28. That is, the subject distance can be acquired by detecting the incident position of the signal light on the PSD 28.

The PSD 28 outputs the light incident position in the form of two output currents, and the ratio of the two current signals of the PSD 28 becomes 1:1 when the signal light is incident to the center of the PSD in the lengthwise direction thereof (the vertical direction in the sheet of FIG. 11). When the signal light is incident to a point which divides the PSD 28 in the ratio of 3:1 in the lengthwise direction, the ratio of the current signals becomes 3:1.

In the second embodiment, the ratio is computed using a well-known compressing/expanding circuit in the analog circuit technology.

The outputs of the PSD 28S are supplied via preamplifiers 78 and 80 to compressing circuits 86 and 88. The outputs of the PSD 28L and those of the PSD 28R are supplied via preamplifiers 82 and 84 to compressing circuits 90 and 92. The outputs of those compressing circuits 86, 88, 90 and 92 are supplied to an expanding-/integrating circuit 102 via buffers 94, 96, 98 and 100.

The CPU 10 receives the output of the expanding/integrating circuit 102 via the output terminal 40 and controls the direction switching circuit 38, the IRED driver 42, a decoder 104 and a reset circuit 106.

FIG. 12 illustrates an example of specific structures of the compressing circuits 86-92, buffers 94-100, expanding/integrating circuit 102, output terminal 40, direction switching circuit 38 and reset circuit 106 shown in FIG. 11. Of the compressing circuits 86-92, the compressing circuits 86 and 88 or 90 and 92 correspond to diodes 103 and 110 in FIG. 12. With regard to the buffers 94 to 100, the combination of the buffers 94 and 96 or the combination of the buffers 98 and 100 is selected by the decoder 104.

Given that $I_1$ and $I_2$ denote currents acquired by amplifying the two signals from the PSD 28, voltages that are generated across compressing diodes 108 and 110 are expressed as follows:

$$V_1 = V_{Tn} \frac{I_1}{I_S} \quad (12)$$

$$V_2 = V_{Tn} \frac{I_2}{I_S} \quad (13)$$

where $I_S$ is the reverse saturation current of the diodes and $V_T$ is the thermal voltage.

Since the emitters of transistors 116 and 118 are connected together, the difference between $V_A$ and $V_B$ in the diagram in the subsequent stage of buffers 112 and 114 becomes:

$$V_1 - V_2 = V_{Tn} \frac{I_1}{I_2} = V_B - V_A = V_{Tn} \frac{I_{OUT}}{I_X} \quad (14)$$

Thus, $$\frac{I_1}{I_2} = \frac{I_{OUT}}{I_X} \quad (15)$$

$$I_X = I_{OUT} \frac{I_2}{I_1} \quad (16)$$

are obtained.

From $$I_{OUT} + I_X = I_0 \quad (17)$$

$$I_{OUT} + I_{OUT} \frac{I_2}{I_1} = I_0 \quad (18)$$

and $$I_{OUT} = \frac{I_1 + I_2}{I_1} = I_0 \quad (19)$$

are derived. Thus, $I_{OUT}$ is expressed as $$I_{OUT} = \frac{I_1}{I_1 + I_2} I_0 \quad (20)$$

where $I_0$ is the current flowing from a current source 120, $I_X$ is the current flowing across a diode 122 and $I_{OUT}$ is the current flowing through the collector of the transistor 118.

Since $I_1 + I_2$ is proportional to the total current of light incident to the PSD, $I_{OUT}$ becomes a current signal dependent only on the subject distance, not dependent on the reflectance of the subject.

Transistors 128 and 130 constituting a current mirror circuit are connected to the collector of the transistor 118 via switches 124 and 126, respectively. The switch 126 is connected to an integrating capacitor 132 that is charged with $I_{OUT}$ and is controlled by the CPU (not shown) via an inverter 134. The reset circuit 106 is provided to reset the integrating capacitor 132 before it is charged with outputs $V_a$ and $V_b$ which will be discussed shortly. Reference numeral "40" denotes the output terminal.

With the above arrangement, as the current source 120 (FIG. 12) is turned ON/OFF in synchronism with the light emission of the IRED and $I_{OUT}$ is charged into the integrating capacitor 132, the integration effect is acquired.

FIGS. 13A and 13B illustrate the light-emitting and integrating operations of the thus constituted circuit.

FIG. 13A illustrates the operation in the normal distance measuring mode, in which a CHANGE signal representing the direction switching shown in FIG. 12 is at a high level (H). Consequently, the switch 124 is set on, and the switch 126 is set off by the inverting action of the inverter 134, permitting a current to flow into the integrating capacitor 132. When an INT signal for integration is enabled/disabled in synchronism with the IRED emission, therefore, the integration output appearing on the output terminal 40 has a step-shaped waveform as shown in FIG. 13A. The output $V_a$ after the IRED emission is performed a predetermined number of times is input as subject distance information to the CPU 10.

The reason for performing the IRED emission plural times is because even when the measured data contains noise, highly accurate distance measurement is possible by averaging the data if the noise is random noise. That is, the greater the number of distance measurements, the more the random noise can be canceled, so that the measuring results are sequentially added using the integrating capacitor 132 to accomplish the noise canceling in an analog manner. The averaging is possible by normalizing the integration result with a predetermined number of distance measurements, and is executed by the CPU 10.

When the subject is moving, however, the result of each measurement varies with the time, so that $V_b$ takes a certain value to $V_{ref}$ as shown in FIG. 13B. The control in this direction of integration is executed by controlling the CHANGE signal in FIG. 12 by the CPU 10. In the example in FIG. 13B, the CHANGE signal is at a high level (H) in the first half of the IRED emissions and is at a low level (L) in the second half. In the first half cycle, the switch 124 is set on and the switch 126 off, permitting the signal current $I_{OUT}$ to be integrated in the positive direction by the current mirror circuit comprising the transistors 128 and 130. In the second half cycle, the switch 124 is set off and the switch 126 on, permitting the signal current $I_{OUT}$ to be integrated in the negative direction. The detection of the movement of the subject is performed with respect to the output of the center distance measuring PSD 28S.

Returning to FIG. 11, the direction switching that allows measurement of distances to three points in the photographic frame will be described below.

The CPU 10 selects that portion of the IRED 20 which emits light in a given direction and drives it via the IRED driver 42. Then, the light from the IRED 20 is reflected on the subject and is incident to the associated PSD 28. The output currents of the PSD 28 are amplified with a low-input impedance by the preamplifiers 78, 80, 82 and 84, and then supplied to the compressing circuits 86, 88, 90 and 92.

The buffers 94, 96, 98 and 100 serve to guide the compressed outputs from the compressing circuits 86, 88, 90 and 92 to the expanding/integrating circuit 102. Those buffers 94, 96, 98 and 100 are selectively switched by the function of the decoder 104. The switching table is given in Table 1 below.

TABLE 1

| Measuring Point | Used IRED | Used Buffers |
|---|---|---|
| Left | 20L | 98, 100 |
| Right | 20R | 98, 100 |
| Center | 20S | 94, 96 |

The reason why the PSD 28L and PSD 28R share the same preamplifiers is to simplify the circuit structure, and the reason for connecting the PSD 28S to the exclusive preamplifiers is to reduce the noise incident to the PSD as much as possible to thereby improve the accuracy.

When the IRED 20L for the left measurement emits light as indicated in Table 1, the buffers 98 and 100 are enabled while the buffers 94 and 96 are disabled. In measuring the distances to three points continuously, the CPU 10 sequentially inputs $V_a$ in the distance measuring sequence explained referring to FIG. 13A while switching the IREDs and buffers according to Table 1. That is, the distances to three points are sequentially measured to ensure multi-measuring.

Figure 14:
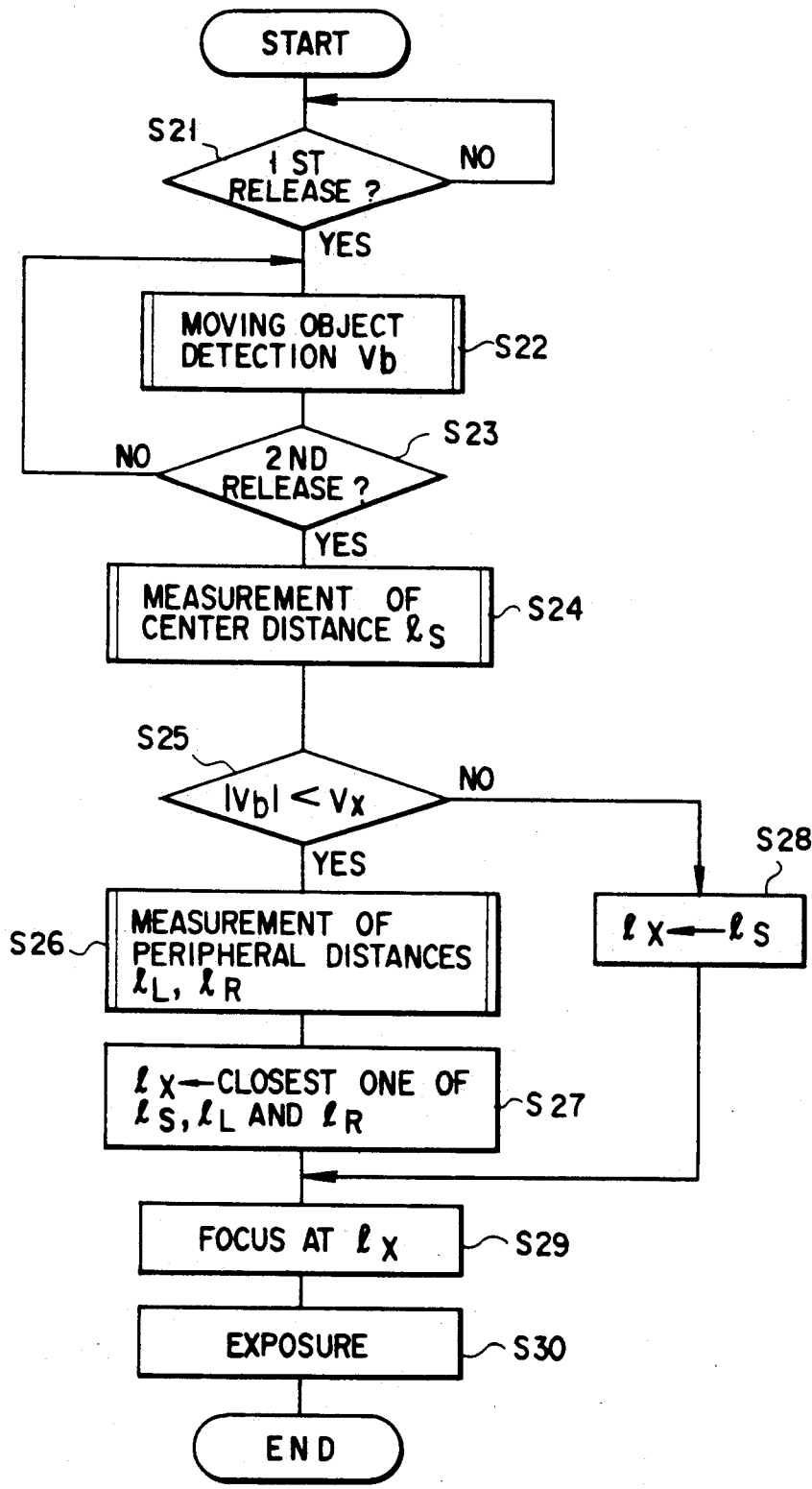
FIG. 14 is a flowchart for explaining the operation of the auto focus camera according to the second embodiment of the present invention.

The operation of the above-described auto focus camera will be described referring to the flowchart in FIG. 14.

First, in step S21, the CPU 10 detects the half-pressed state of the release button of the camera. When the release button is pressed halfway, the flow advances to step S22 where the moving object detection is performed using the outputs of the center distance measuring PSD 28S and the output value is reset by the reset circuit 106 before input the output $V_b$.

In the next step S23, the timing of the pressing of the release button is detected. The moving object detection is repeated, updating $V_b$, until the full pressing of the release button is detected in step S23. When the pressing of the release button is detected, the flow moves to step S24 where the distance to the subject in the center portion of the frame is measured and the distance $l_S$ is acquired from the output $V_a$.

In the subsequent step S25, the discrimination of the moving object detection is executed by comparing the absolute value of $V_b$ with a predetermined voltage. More specifically, when the absolute value of $V_b$ is smaller than the predetermined voltage, it is considered that the subject is not moving and the accuracy-priority first distance measuring mode should be selected. The flow then advances to step S26 where the distances to the subjects present on the right and left in the photographic frame, $l_R$ and $l_L$, are measured while selectively switching the combinations of the IRED 20 and the buffers according to the aforementioned Table 1. In step S27, of $l_S$, $l_L$ and $l_R$, the most closest distance is selected as the focal length.

When it is judged in step S25 that the subject is moving, the time-priority second distance measuring mode should be selected and the flow advances to step S28. In this step S28, $l_S$ is selected as the focal length $l_X$ before the flow moves to step S29.

In step S29 the subject is brought into focus with the focal length $l_X$. When the operations of step S26 and step S27 are performed, the distances to the right and left sides of the photographic frame are measured, thus eliminating so-called central focus error. When the operation of step S28 is performed, the distances to the right and left sides of the frame are not measured, thus shortening the time lag.

Although the moving object detection is carried out by the center IRED 20S and PSD 28S in this embodiment, it is not restricted to this particular type. For instance, right and left moving objects may be detected instead.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An auto focus camera comprising:
   light-emitting means for emitting a pulse-shaped flux of light toward a subject;
   light-receiving means for receiving said flux of light reflected from said subject, and for outputting a signal according to a distance to said subject;
   subject movement detecting means for outputting information about movement of said subject based on said signal from said light-receiving means;

distance computing means for computing a distance to said subject based on said signal from said light receiving means;

comparing means for permitting said subject movement detecting means to function before a shutter release, and for discriminating whether or not movement of said subject detected by said subject movement detecting means is faster than a predetermined speed;

control means for permitting said light-emitting means to perform light emission for a first predetermined number of times in response to said shutter release, and for permitting said distance computing means to compute a distance at a time of this light emission when a result of discrimination by said comparing means indicates that said subject is moving at a low speed or is still, and for permitting said light-emitting means to perform light emission for a second predetermined number of times fewer than said first predetermined number of times in response to said shutter release, and for permitting said distance computing means to compute a distance when said result of discrimination by said comparing means indicates that said subject is moving at a high speed; and distance adjusting means for driving a photographic lens based on an output of said distance computing means controlled by said control means.

2. An auto focus camera according to claim 1, wherein said subject movement detecting means includes:

means for performing positive integration of said signal in a half cycle of the total number of light emissions of said light-emitting means;

means for performing negative integration of said signal in an another half cycle; and means for detecting the movement from a result of integration when said positive and negative integration are completed.

3. An auto focus camera comprising:

light-emitting means for emitting a pulse-shaped flux of light toward a subject;

light-receiving means for receiving said flux of light reflected from said subject, and for outputting a signal according to a distance to said subject;

distance computing means for computing a distance to said subject based on said signal from said light receiving means;

subject movement detecting means for outputting a signal corresponding to a movement of said subject;

comparing means for discriminating whether or not movement of said subject detected by said subject movement detecting means is faster than a predetermined speed;

light-emitting control means for permitting said light-emitting means to perform light emission for a predetermined number of times when a result of comparison by said comparing means indicates that said subject is moving slower than said predetermined value, and for restricting the number of light emissions of said light-emitting means when said result of comparison indicates that said subject is moving faster than said predetermined value; and distance adjusting means for driving a photographic lens based on a distance to said subject output from said distance computing means under light emission control of said light-emitting control means.

4. An auto focus camera comprising:

a first manipulation means to be manipulated before a shutter release;

object movement detecting means for outputting a signal corresponding to movement of a subject in accordance with manipulation of said first manipulation means;

first distance measuring means for accomplishing a distance measurement with priority on time;

second distance measuring means for accomplishing a distance measurement with priority on accuracy;

a second manipulation means for instructing a shutter release;

comparing means for checking if said signal corresponding to said movement detected by said object movement detecting means is higher than a predetermined value to discriminate a moving state of said subject in accordance with manipulation of said second manipulation means;

selecting means for selecting said first distance measuring means when a result of comparison by said comparing means indicates that said subject is moving at a high speed, and for selecting said second distance measuring means when said result of comparison indicates that said subject is moving at a low speed; and focal point adjusting means for driving a photographic lens based on an output of one of said first and second distance measuring means selected by said selecting means.

5. An auto focus camera according to claim 4, wherein said object movement detecting means includes:

light-emitting means for emitting a pulse-shaped flux of light toward a subject;

light-receiving means for receiving said flux of light reflected from said subject, and for outputting a signal according to a position of received light; and means for outputting information about movement of said subject based on said signal from said light-receiving means.

6. An auto focus camera according to claim 4, wherein:

said first distance measuring means includes:

first light-emitting means for emitting a pulse-shaped flux of light toward a subject a first predetermined number of times;

first light-receiving means for receiving said flux of light reflected from said subject, and for outputting a signal according to a position of received light; and first output means for outputting a signal corresponding to a distance to said subject based on said signal from said first light-receiving means; and said second distance measuring means includes:

second light-emitting means for emitting a pulse-shaped flux of light toward a subject a second predetermined number of times greater than said first predetermined number of times;

second light-receiving means for receiving said flux of light reflected from said subject, and for outputting a signal according to a position of received light; and second output means for outputting a signal corresponding to a distance to said subject based on said signal from said second light-receiving means.

7. An auto focus camera comprising:
subject movement information detecting means for detecting information according to movement of a subject;
first distance measuring means for detecting a distance to said subject with priority on time when a result of detection by said subject movement information detecting means indicates that said subject is moving at a high speed;
second distance measuring means for detecting a distance to said subject with priority on accuracy when said result of detection by said subject movement information detecting means indicates that said subject is moving at a low speed; and
focal point adjusting means for adjusting a focal point of a photographic lens based on an output of said first or second distance measuring means.

8. An auto focus camera according to claim 7, wherein each of said first and second distance measuring means includes:
means for repeatedly emitting a flux of light toward said subject; and
means for measuring a distance to said subject based on reflected light from said subject, and
wherein a number of light emissions of said second distance measuring means is greater than that of said first distance measuring means.

9. An auto focus camera comprising:
a first manipulation means to be manipulated before a shutter release;
subject status detecting means for performing integration a predetermined number of times, and for outputting a value representing a result of integration corresponding to a subject movement status;
a second manipulation means for instructing a shutter release;
discrimination means for discriminating if an output of said subject status detecting means is higher or lower than a predetermined value;
first distance-measuring integrating means for performing integration a predetermined number of times for distance measurement;
second distance-measuring integrating means for performing integration a number of times smaller than said predetermined number of times for distance measurement;
selecting means for selecting said first distance-measuring integrating means when a result of discrimination by said discrimination means is higher than a predetermined value, and for selecting said second distance-measuring integrating means when said output of said discrimination by said discrimination means is lower than said predetermined value; and
focal point adjusting means for driving a photographic lens using an output of said distance-measuring integrating means selected by said selecting means.

10. An auto focus camera according to claim 9, wherein said subject status detecting means includes:
means for performing positive integration of a half cycle of said predetermined number of integrations;
means for performing negative integration of another half cycle thereof; and
means for outputting a value corresponding to a result of integration when said positive and negative integrations are completed.

11. An auto focus camera comprising:
first light-emitting means capable of emitting a pulse-shaped flux of light toward a subject in a center portion of a frame a plural number of times;
second light-emitting means capable of emitting a pulse-shaped flux of light toward a subject at a peripheral portion of said frame a plural number of times;
first light-receiving means for receiving said flux of light reflected from said subject in said center portion of said frame, and for outputting a first signal according to a distance to said subject in said center portion of said frame;
second light-receiving means for receiving said flux of light reflected from said subject at said peripheral portion of said frame, and for outputting a second signal according to a distance to said subject at said peripheral portion of said frame;
movement detecting means for receiving said first signal from said first light-receiving means and for outputting information about movement of said subject in said center portion of said frame;
comparing means for comparing said information about said movement of said subject in said center portion of said frame with a predetermined value based on an output of said movement detecting means in response to a release signal; and
subject distance determining means for determining a subject distance for focus adjustment of a photographic lens based on said first signal and said second signal when a result of comparison by said comparing means indicates that a moving speed of said subject in said center portion of said frame is lower than said predetermined value, and for determining said subject distance based on said first signal when said result of comparison by said comparing means indicates that said moving speed of said subject in said center portion of said frame is higher than said predetermined value.

12. An auto focus camera according to claim 11, wherein said movement detecting means includes:
means for performing positive integration of first said signal in a half cycle of the total number of light emissions of said first light-emitting means;
means for performing negative integration of said second signal in an another half cycle; and
means for detecting the movement from a result of integration when said positive and negative integration are completed.

13. An auto focus camera according to claim 11, wherein said subject distance determining means includes:
means for selecting that of said subject distances in said frame which is the closest; and
means for determining said selected distance as said subject distance based on said first and second signals, when said result of comparison by said comparing means indicates that said subject in said center portion of said frame is moving slower than said predetermined value.

14. An auto focus camera comprising:
first distance measuring means for emitting light in a direction of an optical axis of a photographic lens, and for measuring a distance to a subject positioned in said direction of said optical axis based on reflected light from said subject;
first distance measuring means for emitting light in a direction different from said direction of said optical axis of a photographic lens, and for measuring a distance to a subject positioned in a direction different from said direction of said optical axis based on reflected light from said subject;

moving speed detecting means for detecting a value associated with a moving speed of said subject in said direction of said optical axis based on an output of said first distance measuring means;

comparing means for comparing a detection value of said moving speed detecting means with a predetermined value for detecting a moving state; and photographing range determining means for determining a photographing range based on results of measurement by said first and second distance measuring means when a result of comparison by said comparing means indicates that said value associated with said moving speed is smaller than said predetermined value, and for determining said photographing range based on said result of measurement by said first distance measuring means when said result of comparison by said comparing means indicates that said value associated with said moving speed is greater than said predetermined value.

15. An auto focus camera according to claim 14, wherein;

said moving speed detecting means starts functioning in accordance with manipulation of a first release switch which is interlocked with a release button; and said comparing means and said photographing range determining means start functioning in accordance with manipulation of a second release switch which is interlocked with said release button.

16. An auto focus camera comprising:

an operation switch to be operated before a release action;

moving object detecting means for outputting information dependent on a moving speed of a subject in a direction of an optical axis of a photographic lens in accordance with manipulation of said operation switch;

first distance measuring means for measuring a subject distance at a center portion of a photographic frame;

second distance measuring means for measuring a subject distance at a peripheral portion of said photographic frame; and focal point adjusting means for inhibiting distance measurement by said second distance measuring means and for adjusting a focal point of said photographic lens based on an output of said first distance measuring means when it is discriminated that said subject is moving based on said information dependent on said moving speed acquired by said moving object detecting means at a time of manipulation of a release switch for instructing said release action, and for adjusting said focal point of said photographic lens based on outputs of said first and second distance measuring means when it is discriminated that said subject is still.

17. An auto focus camera according to claim 16, wherein said moving object detecting means performs detection based on at least two outputs of said first distance measuring means at different timings.

18. An auto focus camera comprising:

distance measuring means for measuring distances to subjects in a center portion and at a peripheral portion of a photographic frame;

moving object detecting means for detecting information dependent on movement of a subject in a direction of an optical axis; and control means for determining a photographic range based on said distances to said subjects in said center portion and said peripheral portion of said photographic frame measured by said distance measuring means when a result of detection by said moving object detecting means indicates that said subject is almost still, and for inhibiting measurement of a subject distance at said peripheral portion of said photographic frame and determining said photographic range based on said distance of said subject in said center portion when said subject is moving.

19. An auto focus camera comprising:

moving object detecting means for detecting information dependent on movement of a subject in a direction of an optical axis;

discrimination means for discriminating whether said subject is almost still or is moving, based on said information output from said moving object detecting means;

first control means for executing a first distance measuring mode when said discrimination means discriminates that said subject is still; and second control means for executing a second distance measuring mode which takes a longer time for distance measurement than said first distance measuring mode, when said discrimination means discriminates that said subject is moving.

20. An auto focus camera according to claim 19, wherein said first control means includes:

means for determining a photographic range using results of measuring distances to center and peripheral portions of a photographic frame; and means for controlling a photographic lens based on said determined photographing range.

21. An auto focus camera according to claim 19, wherein said first control means includes:

means for determining a photographic range based on an accuracy-priority distance measurement conducted by repeating many light emissions; and means for controlling a photographic lens based on said determined photographing range.

22. An auto focus camera according to claim 19, wherein said second control means includes:

means for determining a photographic range based only on a result of measuring a distance to a center portion of a photographic frame; and means for controlling a photographic lens based on said determined photographing range.

23. An auto focus camera according to claim 19, wherein said second control means includes:

means for determining a photographic range based on a time-priority distance measurement conducted by fewer light emissions; and means for controlling a photographic lens based on said determined photographing range.

* * * * *